US009699147B2

(12) United States Patent
Huang

(10) Patent No.: US 9,699,147 B2
(45) Date of Patent: Jul. 4, 2017

(54) METHOD FOR ENCRYPTING DIGITAL FILE

(75) Inventor: Jinxu Huang, Xiamen (CN)

(73) Assignee: Xiamen Geeboo Information Technology Co. Ltd. (CN)

( * ) Notice: Subject to any disclaimer, the term of this patent is extended or adjusted under 35 U.S.C. 154(b) by 324 days.

(21) Appl. No.: 14/779,475

(22) PCT Filed: Oct. 10, 2011

(86) PCT No.: PCT/CN2011/001695
§ 371 (c)(1),
(2), (4) Date: Sep. 23, 2015

(87) PCT Pub. No.: WO2013/053079
PCT Pub. Date: Apr. 18, 2013

(65) Prior Publication Data
US 2016/0087945 A1 Mar. 24, 2016

(51) Int. Cl.
*H04L 29/06* (2006.01)
*H04L 9/08* (2006.01)
*H04L 29/08* (2006.01)

(52) U.S. Cl.
CPC ........ *H04L 63/0428* (2013.01); *H04L 9/0866* (2013.01); *H04L 63/0435* (2013.01); *H04L 67/06* (2013.01); *H04L 69/22* (2013.01)

(58) Field of Classification Search
None
See application file for complete search history.

(56) References Cited

U.S. PATENT DOCUMENTS

2001/0016836 A1\* 8/2001 Boccon-Gibod .. G06Q 20/3829
705/51
2007/0140482 A1\* 6/2007 Ploog ..................... G06F 21/85
380/44
(Continued)

FOREIGN PATENT DOCUMENTS

CN             1710505 A      12/2005
CN           101271501 A       9/2008
(Continued)

OTHER PUBLICATIONS

International Search Report for Application No. PCT/CN2011/001695 dated Jul. 19, 2012.

*Primary Examiner* — Farid Homayounmehr
*Assistant Examiner* — Henry Tsang
(74) *Attorney, Agent, or Firm* — Lerner, David, Littenberg, Krumholz & Mentlik, LLP

(57) ABSTRACT

Disclosed is a method for encrypting a digital file, comprising the following steps: generating, when a user requests to download a specified digital file, a key, according to inherent information of the user, inherent information of a client terminal used by the user, and inherent information of the specified digital file; encrypting the specified digital file according to the key that has been generated; and performing decryption according to the key and a corresponding decryption procedure, after an encrypted digital file is downloaded at the client terminal used by the user. The technical solution allows dynamic generation of one key each time the digital file is downloaded, thereby truly realizing "one user, one machine, and one copy of the digital file."

14 Claims, 1 Drawing Sheet

(56) References Cited

U.S. PATENT DOCUMENTS

| | | | | |
|---|---|---|---|---|
| 2007/0162978 | A1* | 7/2007 | Watanabe | G06Q 20/3829 726/27 |
| 2008/0215894 | A1* | 9/2008 | Van Gestel | G06F 21/10 713/189 |
| 2010/0054462 | A1* | 3/2010 | Asano | G11B 20/00086 380/42 |
| 2011/0066843 | A1* | 3/2011 | Newman | A63F 13/358 713/153 |
| 2012/0284804 | A1* | 11/2012 | Lindquist | H04L 63/0428 726/29 |

FOREIGN PATENT DOCUMENTS

| | | |
|---|---|---|
| CN | 101282326 A | 10/2008 |
| CN | 101714195 A | 5/2010 |
| CN | 101784045 A | 7/2010 |
| CN | 101853361 A | 10/2010 |
| CN | 101916350 A | 12/2010 |
| CN | 102117395 A | 7/2011 |

\* cited by examiner

METHOD FOR ENCRYPTING DIGITAL FILE

CROSS-REFERENCE TO RELATED APPLICATIONS

The present application is a national phase entry under 35 U.S.C §371 of International Application No. PCT/CN2011/001695 filed Oct. 10, 2011, which is hereby incorporated herein by reference.

FIELD OF THE INVENTION

The present invention relates to the technical field of network information security, and in particular, to a method for encrypting a digital file.

BACKGROUND OF THE INVENTION

Currently, in the Internet information age, people are in increasing demand of information. As a carrier of digital information, digital files have become an indispensable part of reading materials in modern times.

An existing method for encrypting a digital file always has various defects. As a result, digital files can be easily copied, which has been a problem troubling both suppliers and copyright holders of the digital files. For instance, the key of a typical digital file is set for a specific user. After having obtained the key, the user can use it to download the digital file at different client terminals for a plurality of times.

SUMMARY OF THE INVENTION

The present invention provides a method for encrypting a digital file. This method allows dynamic generation of one key each time the digital file is downloaded, thereby truly realizing "one user, one machine, and one copy of the digital file."

In order to achieve the above purpose, the technical solution of the present invention is provided as follows.

The present invention discloses a method for encrypting a digital file, comprising the following steps: generating, when a user requests to download a specified digital file, a key, according to inherent information of the user, inherent information of a client terminal used by the user, and inherent information of the specified digital file; encrypting the specified digital file according to the key that has been generated; and performing decryption according to the key and a corresponding decryption procedure, after an encrypted digital file is downloaded at the client terminal used by the user.

In the above method, the step of generating a key according to inherent information of the user, inherent information of a client terminal used by the user, and inherent information of the specified digital file comprises: encrypting characters comprising the inherent information of the user, the inherent information of the client terminal used by the user, and the inherent information of the specified digital file, through an encryption algorithm, to obtain the key with a fixed number of bits.

In the above method, the inherent information of the user comprises a username.

In the above method, the inherent information of the client terminal used by the user comprises computer name of the client terminal.

In the above method, the inherent information of the specified digital file comprises name of the specified digital file.

In the above method, the step of encrypting the specified digital file according to the key that has been generated comprises: encrypting content of the digital file segment by segment, each segment of the content of the digital file being encrypted with a sub key constituting a part of the key that has been generated.

In the above method, encrypting content of the digital file segment by segment, each segment of the content of the digital file being encrypted with a sub key constituting a part of the key that has been generated comprises the following steps: step a): skipping a file header of the content of the digital file, and letting i=1; step b): reading, from the skipped file header, $N_i$-byte binary content in sequence, acquiring a certain bit of content as a present sub key from the key that has been generated, and using the present sub key to encrypt the binary content that has been read; step c): skipping $M_i$-bit binary content; and step d): judging whether encryption to all the content of the digital file has been completed, and ending the steps if yes; or letting i=i+1, and returning to step b) if no.

In the above method, $N_i$ is determined by relevant information of the specified digital file.

In the above method, $M_i$ equals an identified bit number of the specified digital file.

In the above method, acquiring a certain bit of content from the key that has been generated as a present sub key comprises: performing no encryption on presently read binary content if zero-bit content is obtained from the key that has been generated.

It can be understood that based on the foregoing, in the technical solution of the present invention, a key is generated when a user requests to download the specified digital file, according to the inherent information of the user, the inherent information of the client terminal used by the user, and the inherent information of the specified digital file. Then, the specified digital file according to the key that has been generated is encrypted. Afterwards, decryption is performed according to the key and a corresponding decryption procedure after the encrypted digital file is downloaded at the client terminal used by the user. Because the key is generated when the user requests to download the digital file, according to the inherent information of the user, the client terminal used by the user, and the specified digital file, dynamic generation of one key can be allowed each time the digital file is downloaded, thereby truly realizing "one user, one machine, and one copy of the digital file."

DETAILED DESCRIPTION OF THE EMBODIMENTS

In order to make the purpose, technical solution, and advantages of the present invention more clearly, the present invention will be further explained in conjunction with specific embodiments and the accompanying drawings.

Figure 1:
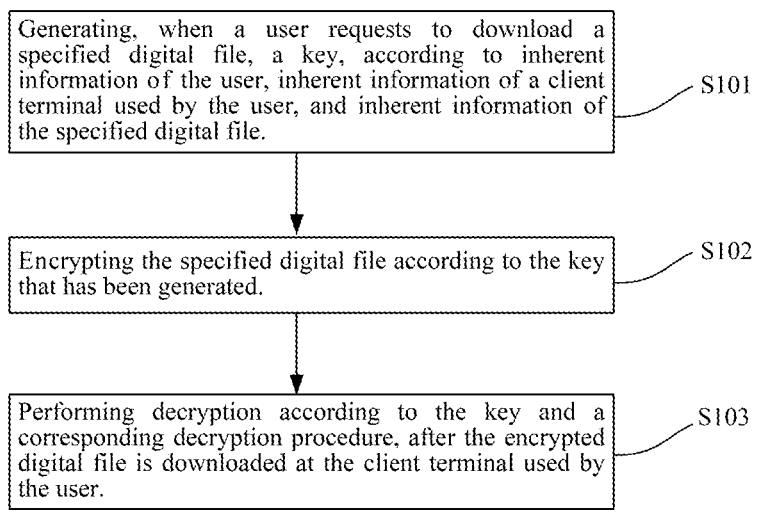
FIG. 1 shows a flow chart of a method for encrypting a digital file according to an embodiment of the present invention.

FIG. 1 shows a flow chart of a method for encrypting a digital file according to an embodiment of the present invention. As indicated in FIG. 1, the method comprises the following steps.

In step 101, when a user requests to download a specified digital file, a key is generated according to inherent information of the user, inherent information of a client terminal used by the user, and inherent information of the specified digital file.

In this step, specifically, characters comprising the inherent information of the user, the inherent information of the client terminal used by the user, and the inherent information of the specified digital file can be encrypted through an encryption algorithm, to obtain the key with a fixed number of bits.

In an embodiment of the present invention, the inherent information of the user comprises, for example, a username; the inherent information of the client terminal used by the user comprises, for example, computer name of the client terminal; and the inherent information of the specified digital file comprises, for example, name of the specified digital file.

In step 102, the specified digital file is encrypted according to the key that has been generated.

In step 103, decryption is performed according to the key and a corresponding decryption procedure after an encrypted digital file is downloaded at the client terminal used by the user.

In the technical solution as indicated in FIG. 1, because the key is generated according to the inherent information of the user, the inherent information of the client terminal used by the user, and the inherent information of the specified digital file, when the user requests to download the specified digital file, dynamic generation of one key can be allowed each time the digital file is downloaded, thereby truly realizing "one user, one machine, and one copy of the digital file."

In step 102 of the method as illustrated in FIG. 1, the procedure of encrypting the specified digital file according to the key that has been generated can specifically comprise: encrypting content of the digital file segment by segment, each segment of the content of the digital file being encrypted with a sub key constituting a part of the key that has been generated.

For instance, in one embodiment of the present invention, encrypting content of the digital file segment by segment, each segment of the content of the digital file being encrypted with a sub key constituting a part of the key that has been generated can specifically comprise the following steps:

step a): skipping a file header of the content of the digital file, and letting i=1;

step b): reading, from the skipped file header, $N_i$-byte binary content in sequence, acquiring a certain bit of content as a present sub key from the key that has been generated, and using the present sub key to encrypt the binary content that has been read;

step c): skipping $M_i$-bit binary content; and step d): judging whether encryption to all the content of the digital file has been completed, and ending the steps if yes; or letting i=i+1, and returning to step b) if no.

In the above steps, $N_i$ is determined by relevant information of the specified digital file, while $M_i$ equals a fixed number of bits dynamically generated according to the inherent information of the specified digital file. If zero bit is obtained from the key that has been generated in step b), the presently read binary content will not be encrypted.

Figure 2:
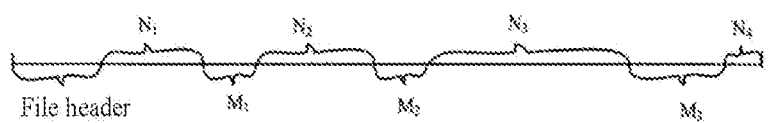
FIG. 2 schematically shows encrypting the content of a digital file according to an embodiment of the present invention.

FIG. 2 schematically shows encrypting content of a digital file according to an embodiment of the present invention. As illustrated in FIG. 2, a line segment of a certain length is used to represent content of the digital file. The parts of the content to be skipped are indicated below the line segment, while the parts of the content to be encrypted are indicated above the line segment.

In the embodiment as shown in FIG. 2, the file header is first skipped, and $N_1$-byte content is read and encrypted with a part, e.g., 32-bit content as a sub key acquired from a 128-bit key that has been generated. $M_1$-bit content is then skipped, and $N_2$-byte content is read and encrypted with a part, e.g., 64-bit content as a sub key acquired from the 128-bit key that has been generated. $M_2$-bit content is then skipped, and $N_3$-byte content is read and encrypted with a part (or all), e.g., 128-bit content as a sub key from the 128-bit key that has been generated. $M_3$-bit content is subsequently skipped, and $N_4$-byte content is read. If zero-bit content is acquired from the 128-bit key that has been generated, then the $N_4$-byte content is not encrypted. The encryption procedure is thus ended.

In the embodiment as shown in FIG. 2, $N_1$, $N_2$, $N_3$, and $N_4$, either equaling one another or not, are determined in accordance with the relevant information of the digital file.

A decryption procedure is an inverse one of the encryption procedure, and therefore will not be repeated herein.

It can be understood that based on the foregoing, in the technical solution of the present invention, a key is generated when a user requests to download the specified digital file, according to the inherent information of the user, the inherent information of the client terminal used by the user, and the inherent information of the specified digital file. Then, the specified digital file according to the key that has been generated is encrypted. Afterwards, decryption is performed according to the key and a corresponding decryption procedure after the encrypted digital file is downloaded at the client terminal used by the user. Because the key is generated when the user requests to download the digital file, according to the inherent information of the user, the client terminal used by the user, and the specified digital file, dynamic generation of one key can be allowed each time the digital file is downloaded, thereby truly realizing "one user, one machine, and one copy of the digital file."

The present invention has been described with reference to preferred embodiments, which are not used to limit the present invention. Various modifications, variants, and amendments to the present invention, without departing from the scope and spirit thereof, should all fall within the scope of the present invention.

The invention claimed is:

1. A method for encrypting a digital file, comprising the following steps:

generating, when a user requests to download a specified digital file, a key, according to inherent information of the user, inherent information of a client terminal used by the user, and inherent information of the specified digital file;

encrypting the specified digital file according to the key that has been generated; and performing decryption according to the key and a corresponding decryption procedure, after an encrypted digital file is downloaded at the client terminal used by the user;

wherein the step of encrypting the specified digital file according to the key that has been generated comprises:

encrypting content of the digital file segment by segment, each segment of the content of the digital file being encrypted with a sub key constituting a part of the key that has been generated;

wherein encrypting content of the digital file segment by segment, each segment of the content of the digital file being encrypted with a sub key constituting a part of the key that has been generated comprises the following steps:

step a): skipping a file header of the content of the digital file, and letting i=1;

step b): reading, starting from the skipped file header, $N_i$-byte binary content of the digital file in sequence, acquiring a certain bit of content as a present sub key from the key that has been generated, and using the present sub key to encrypt the binary content that has been read, step c): skipping $M_i$-bit binary content of the digital file; and step d): judging whether encryption to all the content of the digital file has been completed, and ending the steps if yes; or letting i=i+1, and returning to step b) if no wherein $N_i$-byte and $M_i$-bit correspond to a number of bits/bytes of the content of the digital file.

2. The method according to claim 1, wherein the step of generating a key according to inherent information of the user, inherent information of a client terminal used by the user, and inherent information of the specified digital file comprises:

encrypting characters comprising the inherent information of the user, the inherent information of the client terminal used by the user, and the inherent information of the specified digital file, through an encryption algorithm, to obtain the key with a fixed number of bits.

3. The method according to claim 1, wherein the inherent information of the user comprises a username.

4. The method according to claim 1, wherein the inherent information of the client terminal used by the user comprises computer name of the client terminal.

5. The method according to claim 1, wherein the inherent information of the specified digital file comprises name of the specified digital file.

6. The method according to claim 1, wherein $N_i$ is determined by relevant information of the specified digital file;

wherein said relevant information refers to the number of bytes contained in the specified digital file.

7. The method according to claim 1, wherein $M_i$ equals an identified bit number of the specified digital file.

8. The method according to claim 1, wherein acquiring a certain bit of content from the key that has been generated as a present sub key comprises: performing no encryption on presently read binary content if zero-bit content is obtained from the key that has been generated.

9. The method according to claim 2, wherein the inherent information of the user comprises a username.

10. The method according to claim 2, wherein the inherent information of the client terminal used by the user comprises computer name of the client terminal.

11. The method according to claim 2, wherein the inherent information of the specified digital file comprises name of the specified digital file.

12. The method according to claim 2, wherein $N_i$ is determined by relevant information of the specified digital file;

wherein said relevant information refers to the number of bytes contained in the specified digital file.

13. The method according to claim 2, wherein $M_i$ equals an identified bit number of the specified digital file.

14. The method according to claim 2, wherein acquiring a certain bit of content from the key that has been generated as a present sub key comprises: performing no encryption on presently read binary content if zero-bit content is obtained from the key that has been generated.

* * * * *